US008653983B2

(12) United States Patent
Koshiishi et al.

(10) Patent No.: US 8,653,983 B2
(45) Date of Patent: Feb. 18, 2014

(54) MONITORING AND CONTROL SYSTEM

(75) Inventors: Kingo Koshiishi, Fuchu (JP); Setsuo Tamura, Nakahara-ku (JP); Keiichi Kaneda, Fuchu (JP); Junya Nagata, Hachioji (JP); Yasumasa Watabe, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 501 days.

(21) Appl. No.: 12/994,996

(22) PCT Filed: May 29, 2009

(86) PCT No.: PCT/JP2009/002388
§ 371 (c)(1),
(2), (4) Date: Nov. 29, 2010

(87) PCT Pub. No.: WO2009/144956
PCT Pub. Date: Dec. 3, 2009

(65) Prior Publication Data
US 2011/0074597 A1 Mar. 31, 2011

(30) Foreign Application Priority Data

May 29, 2008 (JP) ................................. 2008 141323

(51) Int. Cl.
*G08B 3/00* (2006.01)
*G08B 5/00* (2006.01)
*G08B 7/00* (2006.01)

(52) U.S. Cl.
USPC ............... 340/691.3; 340/691.6; 340/500; 702/81

(58) Field of Classification Search
USPC ............... 340/691.6, 691.3, 500; 702/81
See application file for complete search history.

(56) References Cited

U.S. PATENT DOCUMENTS

| 4,967,381 | A | * | 10/1990 | Lane et al. ............... 702/81 |
| 5,880,789 | A | * | 3/1999 | Inaba ..................... 725/137 |
| 5,903,256 | A | * | 5/1999 | Kim ...................... 345/157 |
| 5,991,776 | A | * | 11/1999 | Bennett et al. .............. 1/1 |
| 7,680,629 | B2 | * | 3/2010 | Chang et al. ............. 702/187 |
| 2006/0265664 | A1 | * | 11/2006 | Simons et al. ............ 715/772 |
| 2007/0282781 | A1 | * | 12/2007 | Mathiesen et al. ........... 707/1 |
| 2010/0156654 | A1 | * | 6/2010 | Bullemer et al. .......... 340/691.6 |

FOREIGN PATENT DOCUMENTS

| JP | 7 234133 | 9/1995 |
| JP | 9 102000 | 4/1997 |
| JP | 9 146629 | 6/1997 |
| JP | 9 167010 | 6/1997 |

(Continued)

OTHER PUBLICATIONS

International Search Report issued Jun. 30, 2009 in PCT/JP09/001288 filed May 29, 2009.

*Primary Examiner* — Eric M Blount
(74) *Attorney, Agent, or Firm* — Oblon, Spivak, McClelland, Maier & Neustadt, L.L.P.

(57) ABSTRACT

Provided is a monitoring and control system which, by displaying memo information created by an operator on an arbitrary system screen, can enhance freedom of memo display and fully exhibit the effectiveness of memo information. A memo data operation portion 4 receives an input of memo information from an input device 2, imparts attribute information relating to an arbitrary system screen to the memo information, and outputs this with the memo information to a client-side data management portion 6. A display device 1 displays the memo information on a system screen having attribute information.

12 Claims, 16 Drawing Sheets

(56) References Cited

FOREIGN PATENT DOCUMENTS

| | | | |
|---|---|---|---|
| JP | 10 188065 | | 7/1998 |
| JP | 10188065 A | * | 7/1998 |
| JP | 11 184519 | | 7/1999 |
| JP | 2003 18767 | | 1/2003 |
| JP | 2004 145781 | | 5/2004 |
| JP | 2004 199258 | | 7/2004 |
| JP | 2004199258 A | * | 7/2004 |

* cited by examiner

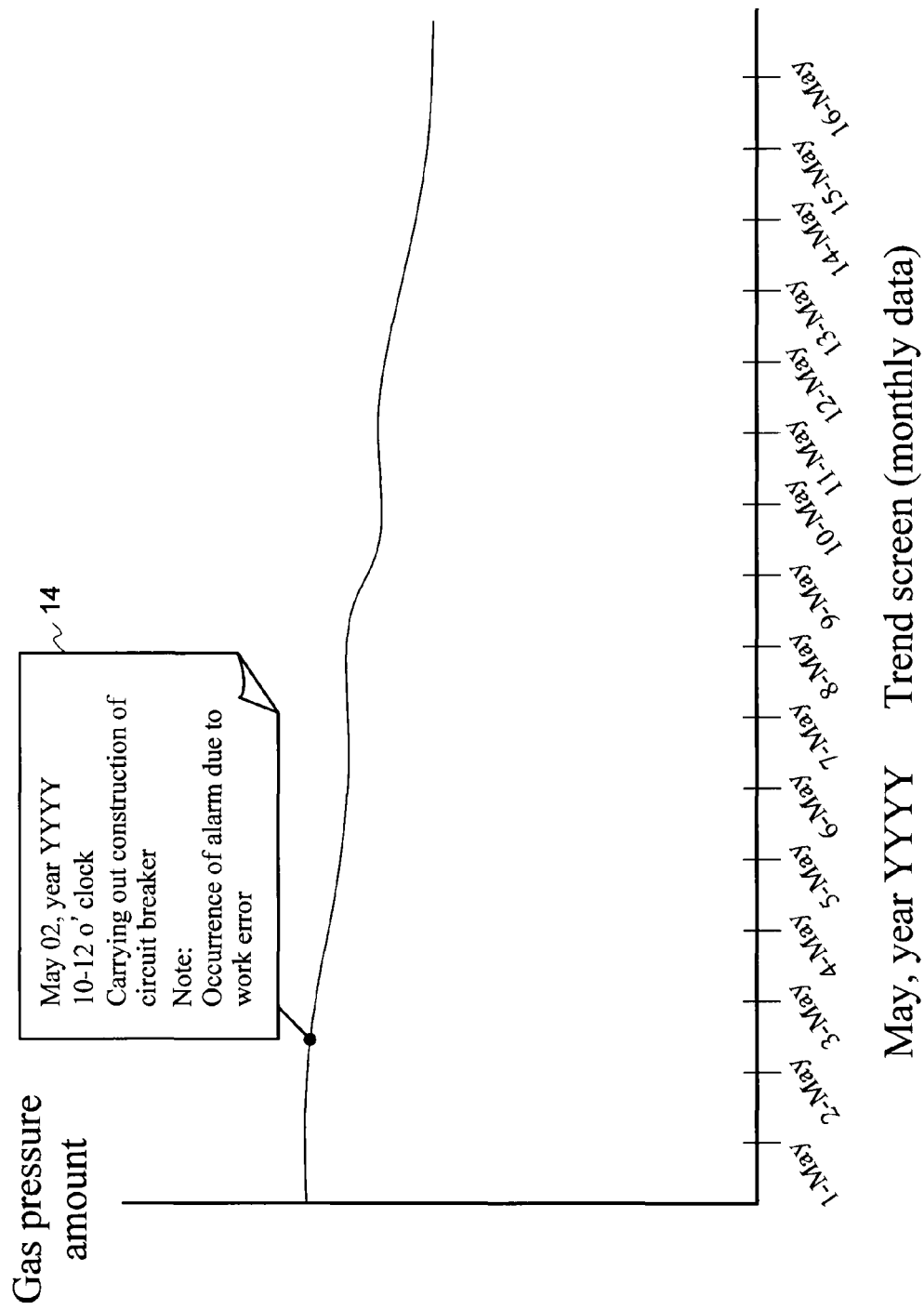

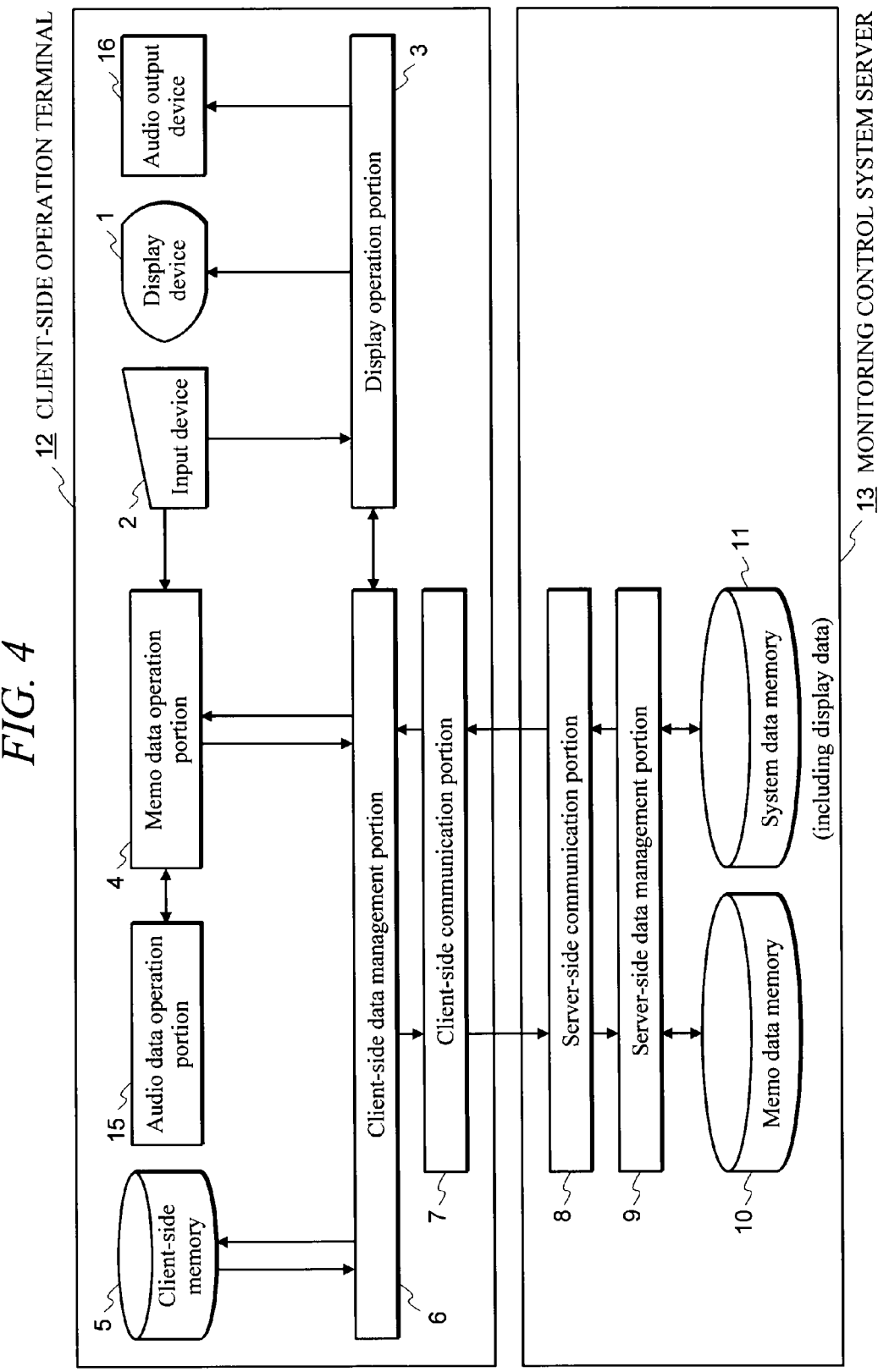

FIG. 5

MEMO DATA MEMORY

| No | Memo body | ... | Screen type | Memo date/time | ... | Audio data ID | Audio data type | Data storage area |
|---|---|---|---|---|---|---|---|---|
| 0001 | Construction of CB ... | ... | Alarm Screen | 2007/05/02/10/11/30 | ... | onsei_0x0001 | Mp3 file | /usr/local/onsei/0001 |
| 0002 | Short-circuit due to ... | ... | SLD Q05 bay | 2007/06/01/09/08/17 | ... | onsei_0x0002 | Mp3 file | /usr/local/onsei/0002 |
| 0003 | Snake touched ... | ... | Q02 bay detail | 2007/07/12/15/17/40 | ... | onsei_0x0003 | Mp3 file | /usr/local/onsei/0003 |
| 0004 | Occurrence of gas ... | ... | Section monitor | 2007/07/19/18/27/11 | ... | onsei_0x0004 | Mp3 file | /usr/local/onsei/0004 |
| ... | ... | ... | ... | ... | ... | ... | ... | ... |

FIG. 7

MEMO DATA MEMORY

| No | Memo body | Screen type | Memo date/time | ... | Video data ID | Video data type | Data storage area |
|---|---|---|---|---|---|---|---|
| 0001 | Construction of CB ... | Alarm Screen | 2007/05/02/10/11/30 | ... | douga_0x0001 | MPEG-2 file | /usr/local/douga/0001 |
| 0002 | Short-circuit due to ... | SLD Q05 bay | 2007/06/01/09/08/17 | ... | douga_0x0002 | MPEG-2 file | /usr/local/douga/0002 |
| 0003 | Snake touched ... | Q02 bay detail | 2007/07/12/15/17/40 | ... | douga_0x0003 | MPEG-2 file | /usr/local/douga/0001 |
| 0004 | Occurrence of gas ... | Section monitor | 2007/07/19/18/27/11 | ... | douga_0x0004 | MPEG-2 file | /usr/local/douga/0002 |
| ... | ... | ... | ... | ... | ... | ... | ... |

MONITORING AND CONTROL SYSTEM

TECHNICAL FIELD

This invention relates to a monitoring and control system for monitoring the constituent equipment of various plants and electric power systems, and in particular relates to a monitoring and control system which can effectively utilize memo information created by an operator.

BACKGROUND ART

In general, an operator responsible for monitoring and control systems at electric power substations and similar monitors the state of an electric power system or circumstances of operation of equipment managed by a system, and upon affirming event information indicating a change in the state of the equipment for monitoring, surveys the entire system being managed, and must quickly and accurately ascertain the causal factors giving rise to the change in state. Hence various running support technologies to support monitoring tasks of an operator have been introduced in the field of monitoring and control systems.

For example, in the plant monitoring control device of Patent Document 2, past alarm data in monitoring control of plant devices and trend data corresponding thereto are displayed having some kind of relationship. In this monitoring control device, when a change occurs in each data, two types of system data supplied from the system are linked and displayed on the same screen, so that the operator can obtain useful supplementary information for ascertaining causal factors of the change. Combinations of data displayed on the same screen may be chosen freely as appropriate; for example, event list data may be combined with a trend graph for the same date.

However, even if different types of system data are displayed on the same screen, depending upon the operator it is possible that a causal factor of a state change may not be perceived, and the effect of the above technique is greatly affected by the degree of expertise of the operator. That is, combining and displaying a plurality of system data items can provide auxiliary or supplementary information to an operator, but ultimately the operator himself must judge correctly.

Upon affirming event information, an operator creates a memo drawing on what was noticed relating to changes in the various states of the equipment for monitoring, and stores the memo separately as memo information on a paper medium, in an electronic medium, or similar. And, through affirmation tasks performed continuously for various system screens (trend graph screens, event list screens, gas compartment screens, and similar), by comparing event information displayed on screens with the memo information, event factors can be accurately and promptly ascertained. That is, memo information created by an operator in monitoring tasks plays an extremely important role.

As running support technology which effectively utilizes memo information created by an operator, for example the trend graph display device described in Patent Document 1 is known. This technology has the characteristic that an operator creates and stores memo information in a system in advance, and when trend data related to a plant facility is displayed, the stored memo information is displayed together.

In the above technology, memo information appended to trend data and stored is displayed, and by this means the memo information can be utilized effectively as running support information, and rereading of important trend data can be performed reliably. Further, it is possible to file only important data with memo information appended, so that there are the advantages of economy even when storing trend data and of the ability to achieve satisfactory manipulability.

Patent Document 1: Japanese Patent Application Laid-open No. 7-234133
Patent Document 2: Japanese Patent Application Laid-open No. 11-184519

However, monitoring and control systems of the prior art have the following problems. As explained above, the device described in Patent Document 1 employs technology in which, by appending memo information, the reliability of rereading important data and economy when storing data are enhanced. That is, memo information can contribute to improve the degree of utilization of system data (here, trend data), but it cannot be said that sufficient consideration has been paid to handling of memo information itself.

That is, by means of the technology described in Patent Document 1, even when memo information is imparted to system data and displayed, when subsequently the memo information is viewed, it may be difficult to read out the causal factors of an event. This difficulty of reading out tends to intensify with the passage of time, and there is the possibility that the role played by memo information may decline. In addition, the increasing complexity of plant facilities is accompanied by an increase in the quantity of data which is an object for monitoring. Hence there is the concern that memo data may be buried within an enormous amount of data, and so there has been the possibility that memo information, created with considerable effort, may be overlooked.

Further, in technology of the prior art the display destination for memo information is limited to a CRT screen or similar within the system, and information sources when creating memo information have also been limited to trend data. Hence when a memo is created at an alarm screen, the memo information cannot be displayed on a trend screen, and the range over which the effect of the memo information extends has been restricted.

For this reason, an operator must remember at which screen he created a memo, and the burden of tasks imposed on the operator has been considerable, so that technologies supporting monitoring tasks which enhance flexibility have been awaited. In particular, in recent years with increasing electric power demand, stabilization of plant running has become an issue of utmost importance, and the accurate ascertainment of factors giving rise to state changes has become a societal imperative. Hence a monitoring and control system which makes full use of memo information created by an operator and can contribute to enhancement of monitoring performance has been awaited.

This invention is proposed in the light of such circumstances, and has as an object the provision of a highly reliable and highly flexible monitoring and control system which, by displaying memo information created by an operator on an arbitrary system screen, can enhance freedom of memo display and fully exhibit the effectiveness of memo information, and which contributes to accurate ascertainment of the causal factors of state changes and to enhancement of monitoring performance.

DISCLOSURE OF THE INVENTION

In order to attain the above object, a monitoring and control system of this invention has display unit that is capable of selectively switching display among a plurality of system screens and displays, on the selected system screen, event information showing a change in a state of an object to be monitored and memo information created by an operator, and input unit that performs input of arbitrary data including input of the memo information by operator operation, and system operation including switching of the system screen, and is characterized in that comprises a memo data operation portion which imparts attribute information relating to an arbitrary system screen to the memo information, wherein the display unit is adopted to display the memo information on the system screen having the attribute information.

In this invention having the above configuration, the memo data operation portion imparts memo information to attribute information related to a system screen, and when the display unit performs display on a system screen having the attribute information, the memo information having the attribute information is displayed together on the system screen. Hence the operator can easily learn event causal factors from memo contents.

In this invention, a memo information display screen is not limited to a system screen at the time of memo creation, and memo information can be displayed on an arbitrary system screen. Hence superior flexibility as a system can be exhibited, and the usefulness of memo information can be enhanced.

By means of a monitoring and control system of this invention, a configuration is employed such that attribute information related to a system screen is imparted to memo information, and memo information is displayed on a system screen having the attribute information, so that a memo created by an operator can be fully utilized, causal factors of state changes can be accurately ascertained, and the monitoring system can be enhanced.

BRIEF DESCRIPTION OF THE DRAWINGS

FIG. 3 shows an example of display of a gas pressure amount graph and memo information on a trend screen;
FIG. 4 shows the configuration of a second embodiment of the invention;
FIG. 5 is an explanatory diagram showing the specific contents of data stored in a storage device in the second embodiment;
FIG. 7 is an explanatory diagram showing the specific contents of data stored in a storage device in the third embodiment.

EXPLANATION OF REFERENCE NUMERALS

Figure 1:
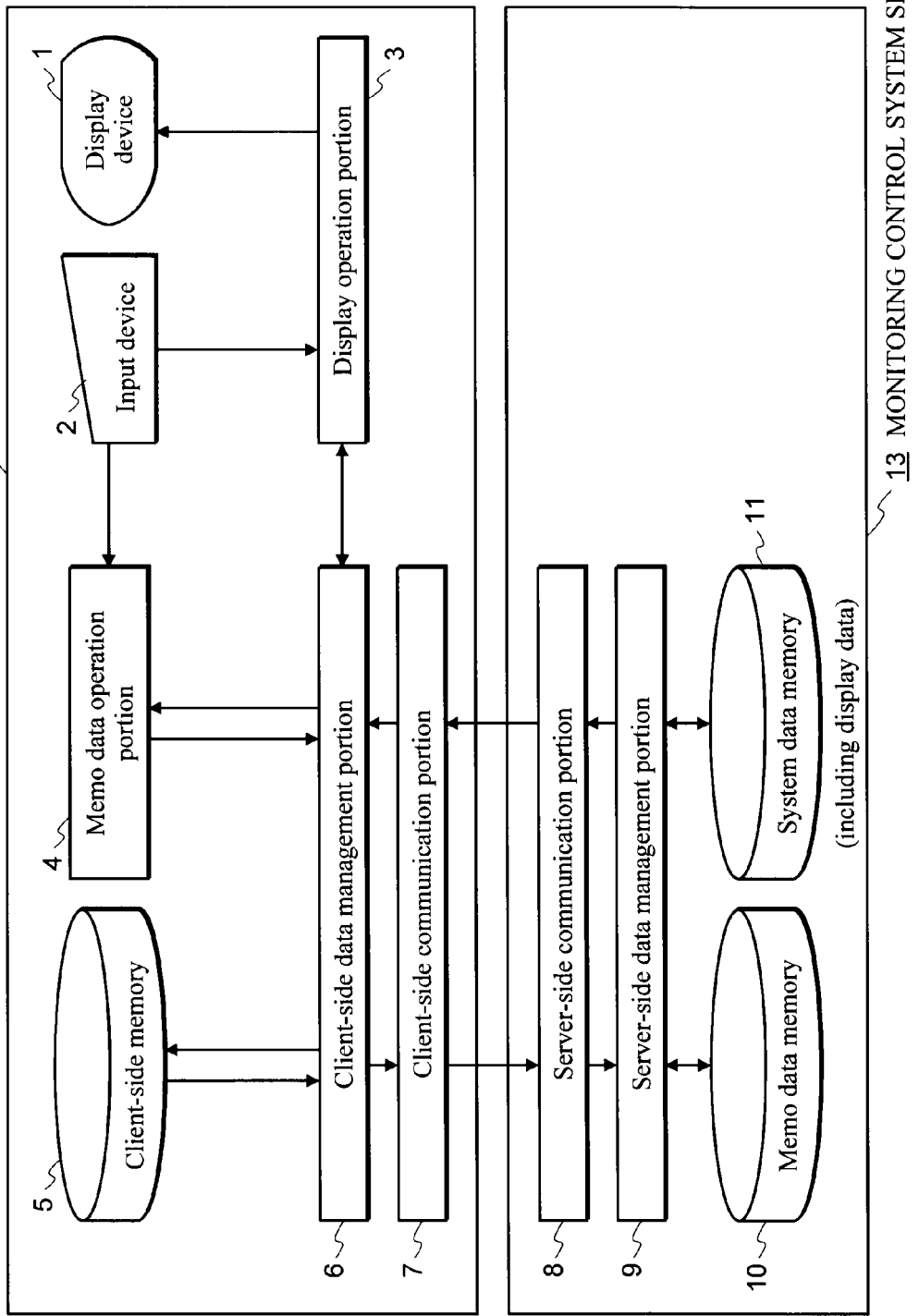
FIG. 1 shows the configuration of a first embodiment of the invention.

| | |
|---|---|
| 1 | Display device |
| 2 | Input device |
| 3 | Display operation portion |
| 4 | Memo data operation portion |
| 5 | Client-side memory |
| 6 | Client-side data management portion |
| 7 | Client-side communication portion |
| 8 | Server-side communication portion |
| 9 | Server-side data management portion |
| 10 | Memo data memory |
| 11 | System data memory |
| 12 | Client-side operation terminal |
| 13 | Monitoring control system server |
| 14 | Memo display example on system screen (trend screen) |
| 15 | Audio data operation portion |
| 16 | Audio output device |
| 18 | Video data operation portion |
| 20 | Mobile terminal communication portion |
| 21 | Mobile terminal |
| 22 | BCU communication portion |
| 23 | BCU device |
| 24 | BCU display device |
| 25 | BCU LED device |
| 26 | Alarm list operation portion |
| 29 | Memo display setting portion |

BEST MODE FOR CARRYING OUT THE INVENTION

Below, embodiments of the invention are explained in detail referring to the drawings. A monitoring and control system of this invention is typically realized by using software to control a computer. The software in this case realizes various computation functions and effects of action of this invention by physically utilizing the hardware of the computer. Further, appropriate technology of the prior art is adopted in portions to which technology of the prior art can be applied.

Further, the specific types and configuration of hardware and software used to realize this invention, the range of processing by software, and similar can be freely modified. For example, a program which realizes this invention, or a computer-readable recording medium on which is recorded such a program, can be regarded as modes of this invention.

Figure 2A:
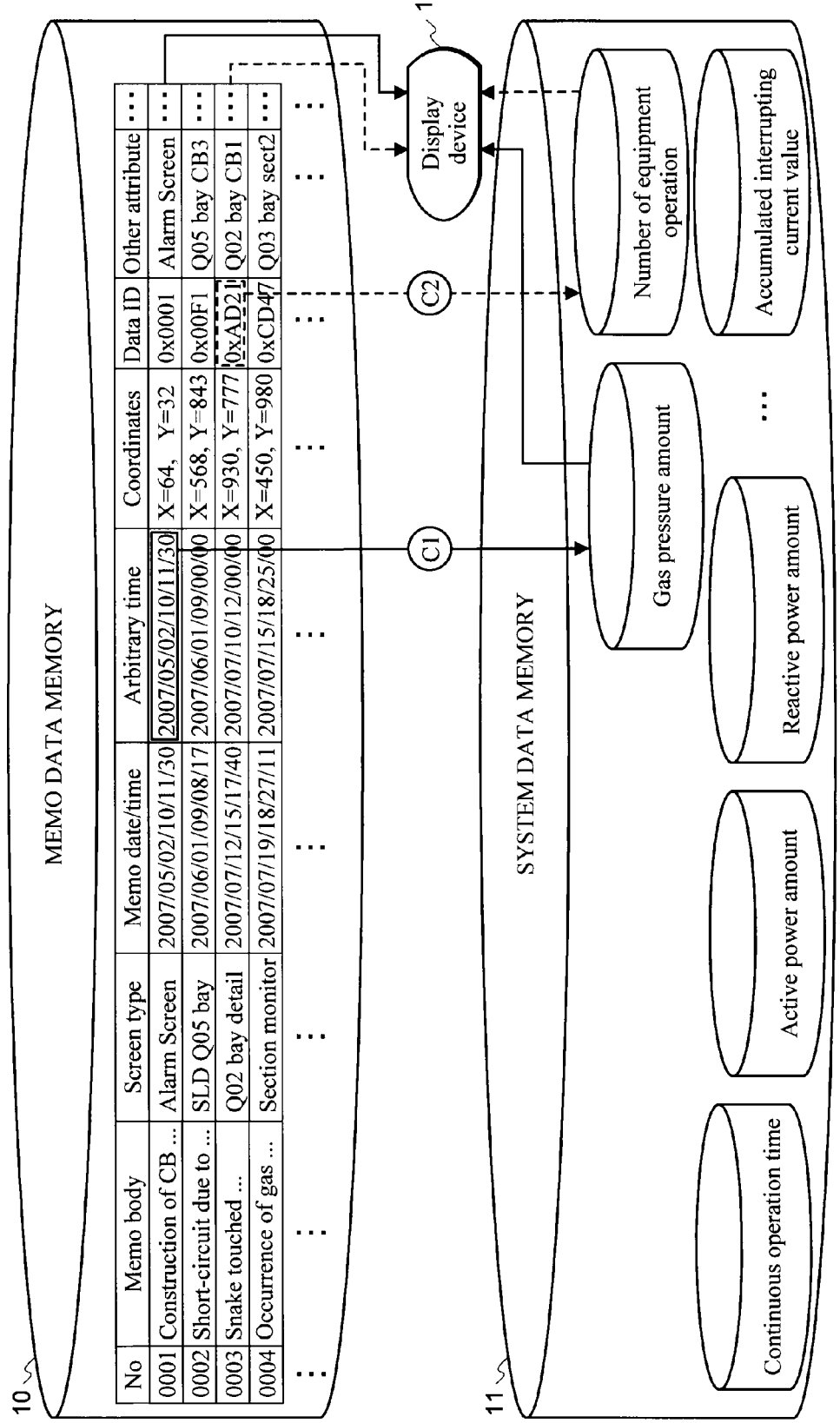
FIGS. 2A and 2B are explanatory diagrams showing the specific contents of data stored in a storage device in the first embodiment.
Figure 2B:
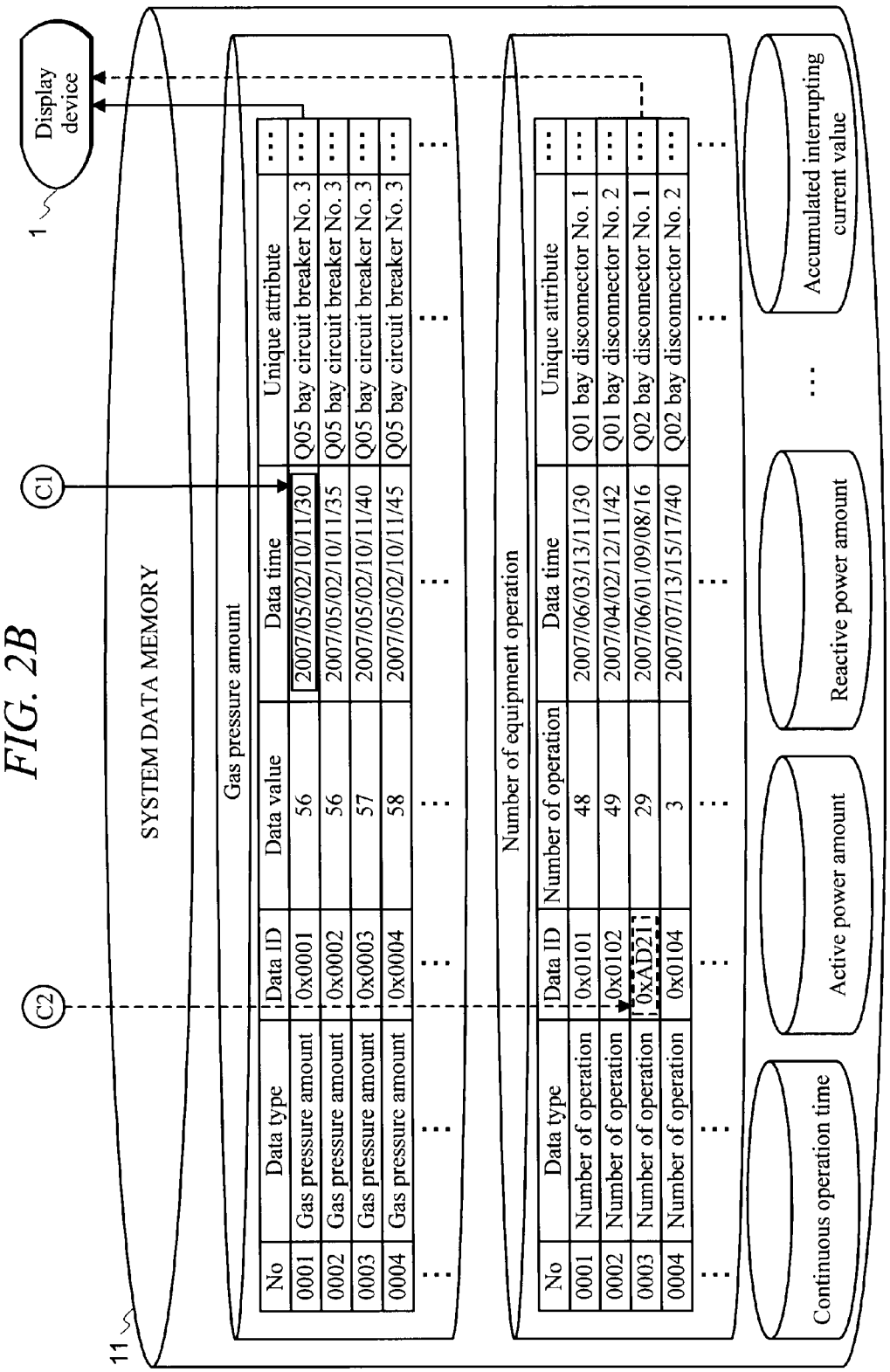

(1) First Embodiment
[1-1] Configuration
A first embodiment of the invention is explained in detail referring to FIG. 1 through FIG. 3. FIG. 1 shows the configuration of the first embodiment of the invention, FIGS. 2A and 2B are explanatory diagrams showing the specific contents of data stored in a storage device, and FIG. 3 shows an example of display of memo information in the first embodiment.
[1-1-1] Summary of the Configuration
In the first embodiment, a client-server model is configured in which a client-side operation terminal 12 and a monitoring control system server 13 are connected by a data transmission system. The client-side operation terminal 12 is an operation terminal which realizes an interface between the system server 13 and an operator. The monitoring control system server 13 is a device which, based on requests from the client-side operation terminal 12, provides various services for monitoring, control and measurement of various plant equipment and electric power systems, which are objects for monitoring by this system.

A client-side data communication portion 7 and server-side data communication portion 8 are disposed in the client-side operation terminal 12 and the monitoring control system server 13 as an interface to perform data transmission therebetween, configured so as to transmit and receive system operation requests, various event data, memo data, and other data to a client-side data management portion 6 and to a server-side data management portion 9 respectively.

[1-1-2] Configuration of Client-Side Operation Terminal 12

In the client-side operation terminal 12 are provided, in addition to the management portion 6 and communication portion 7, a display device 1, input device 2, display operation portion 3, memo data operation portion 4, and client-side memory 5.

Of the above constituent elements, the memo data operation portion 4 is a principal portion of this embodiment. The memo data operation portion 4 is configured so as to receive input of memo information from the input device 2, impart attribute information relating to an arbitrary system screen to the memo information, and output this together with the memo information to the client-side data management portion 6.

The memo data operation portion 4 has functions for adding, deleting, and editing memo information, and similarly passes to the client-side data management portion 6 requests for addition, deletion, and editing of memo information received from the input device 2. Attribute information relating to an arbitrary system screen imparted to memo information may be date/time data (year/month/day/hour/minute/second) or a data ID on a system screen. A data ID is an ID unique to each data item, and is set for each data item.

Further, the memo data operation portion 4 also imparts, to memo information, attribute information relating to the contents of a memo created by an operator. Attribute information in this case may be the type of system screen at which the operator created the memo, the date/time (year/month/day/hour/minute/second) of memo creation, the coordinates of the memo on a screen, and other attribute information. The above attribute information is stored in memo data memory 10 and system data memory 11, described below, on the side of the monitoring control system server 13 (see FIG. 2).

This embodiment has the further configuration characteristic that a client-side memory 5 is provided on the side of the client-side operation terminal 12. The client-side memory 5 is a storage device to temporarily store, on the side of the client-side operation terminal 12, various information received from the monitoring control system server 13 via the client-side data management portion 6 and communication portion 7.

The display device 1 is display means for selectively switching display to a system screen by operator operation, and for displaying arbitrary event information and memo information on the system screen. The display device 1 is connected to the display operation portion 3, and is configured so as to take as inputs event information, memo information and system screen display information from the display operation portion 3, and as to output the system screen display information on the display screen of the display device 1, as well as to output event information and memo information to the system screen.

System screen display information is for example display information to display a single-line diagram screen, display information to display an event screen, or similar; a system screen displayed using the display device 1 may be a trend graph screen, event list screen, gas compartment screen, or similar. Display information for these system screens has the above-described attribute information (data date/time and data ID).

Further, event information displayed on a system screen specifically indicates the following kind of data. That is, the data may be operation data of monitored equipment displayed on a single-line diagram screen which is a system screen, or notification data of occurrence of a system anomaly displayed on an event list screen which is also a system screen, or data created as new separate system information by unification of this information by the system.

The input device 2 is connected to the display operation portion 3 and the memo data operation portion 4. At this time, text input from a keyboard and arbitrary data input to the display operation portion 3 are performed through operation by an operator, and screen switching operations or other system operations are performed using a mouse or similar. Further, the contents of a memo created by an operator are passed as memo data to the memo data operation portion 4, and a request for registration thereof is issued on the side of the system server 13.

The display operation portion 3 is configured so as to pass input data received from the input device 2 to the client-side data management portion 6, as well as receive event information, memo information, system screen display information, and various other kinds of information from the client-side data management portion 6, and output this information to the display device 1.

The client-side data management portion 6 is connected to the display operation portion 3, memo data operation portion 4, client-side memory 5, and client-side communication portion 7. The client-side data management portion 6 receives the above-described requests, memo information, and attribute information from the display operation portion 3 and memo data operation portion 4, and outputs these to the client-side communication portion 7.

Further, the client-side data management portion 6 is a portion which receives event information and memo information, attribute information, system screen display information, and similar from the monitoring control system server 13 via the client-side communication portion 7, and stores these in client-side memory 5. And, the client-side data management portion 6 appropriately retrieves information stored in the client-side memory 5 and outputs this to the display operation portion 3.

[1-1-3] Configuration of Monitoring Control System Server 13

The monitoring control system server 13 comprises the server-side communication portion 8 and server-side data management portion 9, and is also provided with memo data memory 10 and system data memory 11 including display information, as storage devices.

Of these, the server-side data management portion 9 is a portion which acquires from the system data memory the required system screen display information (as explained above, display information to display single-line diagram screens and display information to display event screens), according to requests from the client-side operation terminal 12, and passes this to the client-side operation terminal 12 via the server-side communication portion 8.

Further, the server-side data management portion 9 stores memo information received from the client-side operation terminal 12 in memo data memory 10, and at the time of a memo information acquisition request from the client-side operation terminal 12, retrieves memo information from memo data memory 10 according to the request, and passes the information to the client-side operation terminal 12. FIG.

2 shows, on the side of the system server 13, an example of a data structure stored in memo data memory 10, and an example of a data structure stored in system data memory 11.

In the above first embodiment, information stored in client-side memory 5 can also be included in system data memory 11 on the side of the monitoring control system server 13. Further, the server-side communication portion 8 can transmit memo information not only to a client-side operation terminal 12 in the same domain, but to a network in a different segment also. For example, when a monitoring control system server 13 is a substation monitoring control system server, transmission to a central load dispatching office which is a higher-level system is also possible.

[1-2] Action

Action of the first embodiment having the above-described configuration is as follows. That is, an operator monitors the states of various plant equipment and electrical power systems, based on various system information displayed by the display device 1.

Here, suppose that the operator has recognized the occurrence of event information indicating a state change of equipment for monitoring. Occurrence of event information, when the first embodiment has been applied to a substation monitoring control system, is for example confirmation of operation of a breaker on a single-line diagram screen, or display of a system alarm on an alarm screen, or similar.

At this time, the operator uses the input device 2 for text input, as a memo, of the causal factor of the state change, that is, the reason for occurrence of the event, learned from information sources separate from the system. Here, the input device 2 sends the input data as memo information to the memo data operation portion 4, and also requests registration on the side of the system server 13.

Specific examples of memo contents input as the reason for occurrence of the event include the statement "occurred due to gas circuit breaker construction error on this date", and, as the reason for operation of a circuit breaker, "short-circuited because a snake touched a transmission line".

Having received input of memo information from the input device 2, the memo data operation portion 4 imparts attribute information to the memo information, and passes this, together with the memo information, to the client-side data management portion 6. The imparting of attribute information to the memo information is none other than performing association with a system screen having the attribute information.

For example, when memo information is to be associated with a circuit breaker, a data ID specifying the circuit breaker becomes attribute information, and when memo information is to be associated with an arbitrary time, data time becomes attribute information. Attribute information imparted to memo information may be, as already stated, data time on a system screen, a data ID, the type of system screen when an operator creates a memo, the time a memo was created, the memo coordinates on a screen, and similar.

The client-side data management portion 6, after receiving memo information to which attribute information has been imparted from the memo data operation portion 4, sends the memo information from the client-side operation terminal 12 to the monitoring control system server 13 via the client-side communication portion 7 and server-side communication portion 8. In the monitoring control system server 13, the received memo information is stored in memo data memory 10 by the server-side data management portion 9.

After the memo information is stored in memo data memory 10, the operator uses the input device 2 and display device 1 to request an arbitrary system screen of the monitoring control system, and specifies attribute information set for the system screen, such as for example an arbitrary time at which the system screen is to be displayed, or similar. The request resulting from this operator operation and the specification result are passed from the display operation portion 3 to the client-side data management portion 6, and are sent, via the client-side communication portion 7 and server-side communication portion 8, to the server-side data management portion 9 of the monitoring control system server 13.

In the server-side data management portion 9, memo information having the specified attribute information is acquired from memo data memory 10 based on the specification result thus sent, and together with this, display information to display a system screen which is the request system screen and moreover has the specified attribute information (for example, an arbitrary time) is acquired from system data memory 11.

The server-side data management portion 9 passes the memo information and display information acquired from memo data memory 10 and system data memory 11 to the client-side operation terminal 12 via the server-side communication portion 8 and client-side communication portion 7. On the side of the client-side operation terminal 12, the memo information and system screen display information received from the monitoring control system server 13 is temporarily stored in client-side memory 5 by the client-side data management portion 6.

After storing the above information in client-side memory 5, the client-side data management portion 6 acquires necessary information from client-side memory 5, and passes the information to the display operation portion 3. The display operation portion 3 uses the information acquired from client-side memory 5 to output, to the display device 1, display information for a system screen which is the requested system screen and which has the specified attribute information, and memo information having the specified attribute information. By this means, the display device 1 displays memo information on the system screen associated by the imparting of attribute information.

The processing indicated by the solid-line arrows in FIG. 2 indicates an example in which, when there is coincidence of the "arbitrary time information (2007/05/02/10/11/30)" stored in memo data memory 10, which is attribute information imparted at the time of memo creation, and the gas pressure "data time (2007/05/02/10/11/30)" stored in system data memory 11 which is attribute information of the system screen, the memo information (memo No. 0001) and the gas pressure data (No. 0001) are simultaneously output to the display device 1.

Further, the processing indicated by the dashed-line arrows in FIG. 2 indicates an example in which, when the data ID (0×AD21) stored in memo data memory 10 and imparted to the memo information coincides with the data ID of the equipment operation number No. 0003 (0×AD21) stored in system data memory 11, the memo information (memo No. 0003) and the equipment operation number (No. 0003) are simultaneously output to the display device 1. In order to facilitate understanding, the processing indicated by these arrows is illustrated such that information is sent from memory 10 and 11 to the display device 1; but in actuality, various information is called from client-side memory 5 so as to heighten responsiveness.

FIG. 3 shows an example of specific display in the display device 1 at this time. FIG. 3 shows memo data 14 on a gas pressure trend graph screen as the requested system screen. Here, the memo data created by the operator is provided with memo creation time information as memo attribute data, and the memo data 14 is displayed on the gas pressure screen at the position of this time. The example of FIG. 3 is a case in which, on the occasion of gas circuit breaker construction in the past, with the occurrence of a circuit breaker gas pressure anomaly on an alarm screen, a memo is created by an operator and is stored as memo data, and at a later date the gas pressure graph on the day of construction is monitored using a trend screen.

As is clear from FIG. 3, subsequent to the day of construction, the gas pressure decreases, but from the statement "alarm occurred due to work error" which is a displayed memo data annotation, it is possible to judge that a factor of the continuing decrease in gas pressure is the construction on that day. As a result, the time required for system restoration can be greatly shortened.

As in the above example, by imparting attribute information having a system screen to memo information, association of the two is possible. Hence by imparting and providing to memo information not only the above time information, but for example data IDs unique to various data items as attribute information, the two can be associated, and the two data items can be output and displayed together. This corresponds to the output example of the dashed-line arrows in the above-described FIG. 2.

[1-3] Effects

As explained above, when in the first embodiment an operator monitoring a system screen displayed by the display device 1 has affirmed event data displayed on the system screen, the operator uses the input device 2 to create and input memo data relating to a factor causing the event. Here, through the imparting of attribute information to the memo information by the memo data operation portion 4, the memo information can be associated with the system screen.

The display operation portion 3 receives memo information with attribute information imparted from the memo data operation portion 4, and also acquires display information for the system screen having the same attribute information from client-side memory 5, and outputs these memory items simultaneously to the display device 1. Hence the display device 1 can display the memo information on the system screen associated by the imparting of attribute information.

Hence when an operator affirms a past system screen at a later date, memo information which is called based on the stored attribute information can be displayed together on the called system screen, and by reading the memo information the operator can easily ascertain a causal factor of an event.

Moreover, a system screen which displays memo information is not limited to the system screen at the time of creation of the memo information, and memo information can be displayed on an arbitrary screen, so long as the system screen is associated by the imparting of attribute information. Hence memo information can be viewed reliably, and memo information which has been created with considerable effort can be utilized effectively, without concern that the memo information may be overlooked. And, the operator need not remember on which screen memo information was created, but simply by requesting a system screen and specifying attribute information, can reliably display memo information.

In such an embodiment, flexibility in storing and displaying memo information can be provided, and excellent usability can be obtained. As a result, the efficiency of tasks performed by an operator in such system management tasks as investigation of the causes of system operation is greatly improved. As a result the burden on an operator is alleviated, greatly contributing to the enhancement of monitoring performance as support technology for monitoring tasks.

Further, in this embodiment a memory 5 is provided in the client-side operation terminal 12, enabling storage of memo information and system screen display information received from the side of the monitoring control system server 13. Hence information access processing can be performed on the local side, and excellent display responsiveness can be exhibited.

(2) Second Embodiment

[2-1] Configuration

Next, a second embodiment of the invention is explained using FIG. 4 and FIG. 5. FIG. 4 is a configuration diagram of the second embodiment, and FIG. 5 is an explanatory diagram showing specific contents of data stored in a storage device. The basic configuration of the embodiment described below is similar to that of the first embodiment above. Hence the same symbols are assigned to the same constituent elements, and redundant explanations are omitted.

As shown in FIG. 4, characteristics of the second embodiment are the addition of an audio data operation portion 15 and an audio output device 16 to the client-side operation terminal 12 in the configuration of the above first embodiment. Of these, the audio output device 16 is connected to the display operation portion 3, and is a portion which outputs audio data.

Further, the audio data operation portion 15 is connected to the memo data operation portion 4, and adds an audio data attribute value to memo information input from the input device 2 via the memo data operation portion 4, and also can arbitrarily set the audio type and intensity in audio data.

In the input device 2 of the second embodiment, when an operator performs memo input, audio output from a microphone or other arbitrary audio data is input. Audio data may be, for example, an electronic file using the MP3 (MPEG Audio Layer 3) or other audio compression method.

The audio data attribute value is imparted to audio data input from the input device 2, and is a unique ID to identify audio data, an audio data type, data storage area information, or similar. FIG. 5 is an example of addition of the above attribute value to memory information; the result is stored in memo data memory 10, and indicates the contents of memo information including an attribute value (portion surrounded by a dashed line) of audio data.

The memo data operation portion 4 outputs audio data, input from the input device 2, to the audio data operation portion 15. Further, the memo data operation portion 4 outputs audio data together with memo information to the client-side data management portion 6. And, the client-side data management portion 6 is configured so as to receive requests due to operator operation, memo information, and audio data, and output this data to the client-side communication portion 7.

With respect to transmission/reception of data via the communication portions 7 and 8 between the client-side operation terminal 12 and the monitoring control system server 13, and data processing on the side of the monitoring control system server 13, except for the addition of audio data to the data, the configuration is similar to that of the first embodiment above.

[2-2] Action

Action of the second embodiment having the above-described configuration is as follows. That is, at the time of memo information creation, an operator uses the input device 2 to input arbitrary audio data into the memo data operation portion 4. The memo data operation portion 4 outputs the input audio data to the audio data operation portion 15. The audio data operation portion 15 adds an ID to identify the audio data, the data type, data storage area information, or other audio data attribute values to the memo information.

The memo data operation portion 4 passes the memo information with the above-described audio data attribute values and the audio data to the client-side data management portion 6. The client-side data management portion 6 sends the memo information and audio data to the monitoring control system server 13 via the client-side communication portion 7, and in the monitoring control system server 13, the memo information and audio data are stored in memo data memory 10.

After storing data in memo data memory 10, the operator uses the input device 2 and display device 1 to request an arbitrary system screen of the monitoring control system, and specifies the attribute information set for the system screen. In the server-side data management portion 9, memo information and audio data having the specified attribute information are acquired from memo data memory 10 based on the specification result sent, and together with this, display information to display the system screen which is the requested system screen and which has the specified attribute information is acquired from system data memory 11.

The server-side data management portion 9 passes the memo information, audio data and display information acquired from memory 10 and 11 to the client-side operation terminal 12 via the server-side communication portion 8 and the client-side communication portion 7. On the side of the client-side operation terminal 12, the memo information, audio data and display information received from the monitoring control system server 13 are temporarily stored in client-side memory 5 by the client-side data management portion 6.

After storing the above information in client-side memory 5, the client-side data management portion 6 acquires necessary information from client-side memory 5, and passes this information to the display operation portion 3. The display operation portion 3 uses information acquired from client-side memory 5 and outputs display information for the system screen which is the requested system screen and which has the specified attribute information, and memo information having the specified attribute information, to the display device 1. By this means, the display device 1 displays the memo information on the system screen associated by the imparting of attribute information. Further, the display operation portion 3 outputs the audio data to the audio output device 16. The audio output device 16 outputs audio data, according to the audio type and intensity set by the audio data operation portion 15, when the display device 1 displays the memo information on the system screen.

[2-3] Effects

In addition to the effects of the above-described first embodiment, the above-described second embodiment has the following effects. First, upon display of memo information by the display device 1, audio data giving notification of the existence of memo information can be output from the audio output device 16. Consequently an operator who has created memo information can clearly be notified of the existence of memo information. Hence memo information is not overlooked, and the usefulness of memo information can be enhanced.

Second, by adding attribute values for audio data, audio data can be distinguished by the contents of memo information. Specifically, classification by the importance of the memo contents in memo information, classification by the equipment for monitoring associated with the memo information, and similar are possible, and the audio type and intensity in audio data can be set arbitrarily by the audio data operation portion 15 according to this classification. Hence the contents of memo information can easily be judged from audio data, without affirming the display screen on the display device 1. By this means, the number of times screens are viewed to affirm memo information is reduced, and so there is the advantage that the burden on the operator is lightened.

(3) Third Embodiment

[3-1] Configuration

Figure 6:
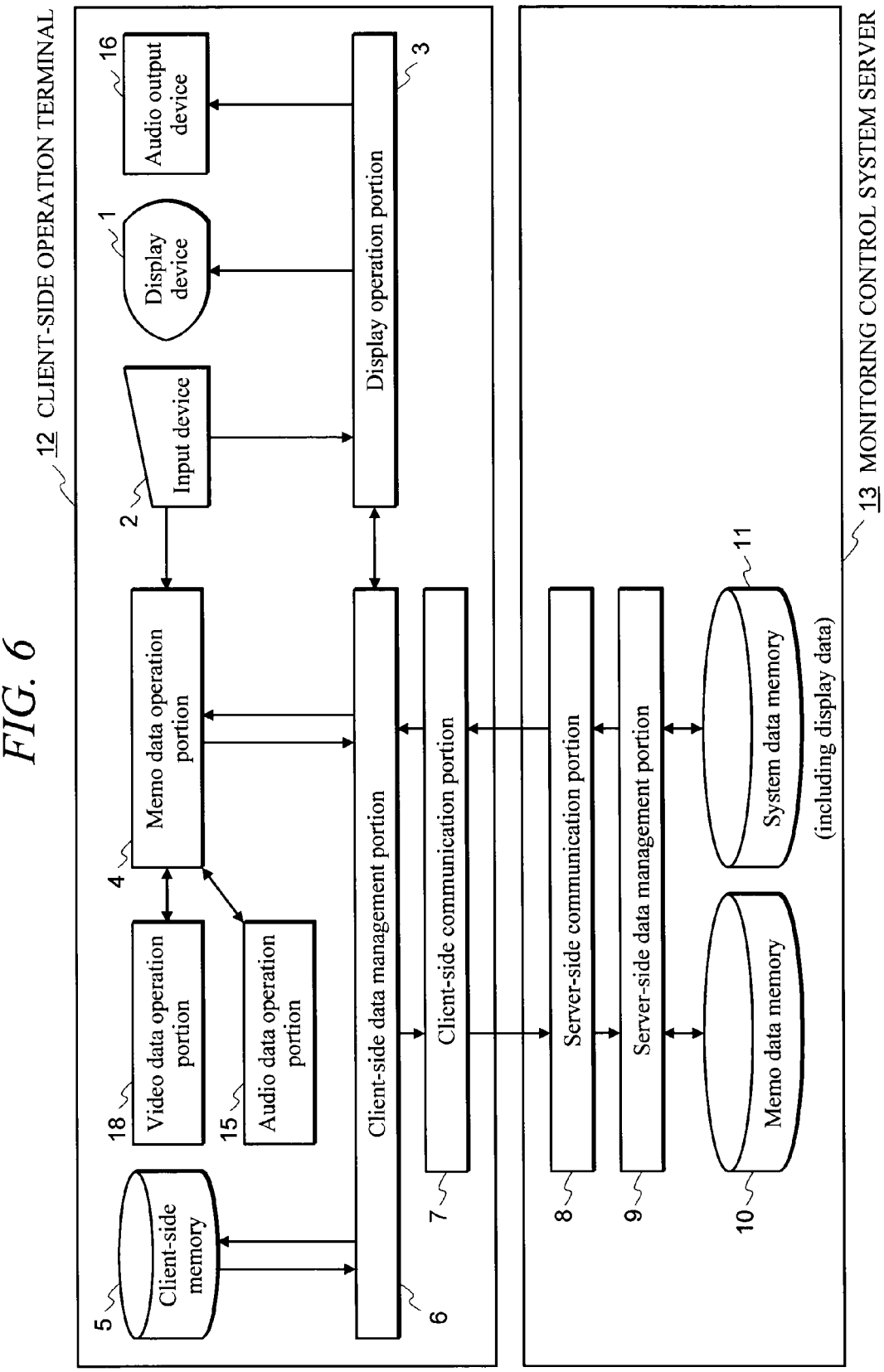
FIG. 6 shows the configuration of a third embodiment of the invention.

Next, a third embodiment of the invention is explained using FIG. 6 and FIG. 7. FIG. 6 is a configuration diagram of the third embodiment, and FIG. 7 is an explanatory diagram showing specific contents of data stored in a storage device.

As shown in FIG. 6, a characteristic of the third embodiment is the addition to the second embodiment of a video data operation portion 18 in the client-side operation terminal 12. That is, in the third embodiment, when an operator performs memo input using the input device 2, arbitrary video data is input, and in addition this video data is handled by the video data operation portion 18. Video data is for example a video file using MPEG-2 or another image data compression method, and includes memo objects, character blinking data, and similar.

As shown in FIG. 6, the video data operation portion 18 is connected to the memo data operation portion 4, and is configured so as to add video data attribute values to memo data input from the input device 2 via the memo data operation portion 4, as well as performing addition, deletion, and editing of video data.

A video data attribute value is imparted to video data input from the input device 2, and may be a unique ID to identify the video data, the video data type, data storage area information, or similar. FIG. 7 is an example of addition of attribute values to memo information, and shows the contents of memo information, stored in data memory 10, including attribute values (the portion surrounded by the dashed line) for video data.

The memo data operation portion 4 outputs video data input from the input device 2 to the video data operation portion 18. Further, the memo data operation portion 4 also outputs video data, in addition to memo information and audio data, to the client-side data management portion 6.

The client-side data management portion 6 is configured so as to receive requests due to operator operation, memo information, audio data, and video data, and output this data to the client-side communication portion 7. With respect to transmission/reception of data via the communication portions 7 and 8 between the client-side operation terminal 12 and the monitoring control system server 13, and data processing on the side of the monitoring control system server 13, except for the addition of video data to the data, the configuration is similar to that of the second embodiment above.

[3-2] Action

Action of the third embodiment having the above-described configuration is as follows. That is, at the time of memo creation, an operator uses the input device 2 to input arbitrary video data, such as video input from a camera, or video input selected from a group of prescribed videos prepared in advance, or similar into the memo data operation portion 4. The memo data operation portion 4 outputs the input video data to the video data operation portion 18. The video data operation portion 18 adds an ID to identify the video data, the type of video data, data storage area information, or other video data attribute values to the memo information.

The memo data operation portion 4 passes the memo information with video data attribute values added and the video data to the client-side data management portion 6. The client-side data management portion 6 sends the memo information with video data attributes added and video data to the monitoring control system server 13 via the communication portion client-side 7, and in the monitoring control system server 13, the memo information and video data are stored in memo data memory 10.

After storing data in memo data memory 10, the operator uses the input device 2 and display device 1 to request an arbitrary system screen of the monitoring control system, and specifies the attribute information set for the system screen. In the server-side data management portion 9, memo information, audio data and video data having the specified attribute information are acquired from memo data memory 10 based on the specification result sent, and together with this, display information to display the system screen which is the requested system screen and which has the specified attribute information is retrieved from the system data memory 11.

The server-side data management portion 9 passes the memo information, audio data and video data retrieved from memory 10 and 11 to the client-side operation terminal 12 via the server-side communication portion 8 and the client-side communication portion 7. On the side of the client-side operation terminal 12, the memo information, audio data and video data received from the monitoring control system server 13 are temporarily stored in client-side memory 5 by the client-side data management portion 6.

After storing the above information in client-side memory 5, the client-side data management portion 6 acquires necessary information from client-side memory 5, and passes this information to the display operation portion 3. The display operation portion 3 uses information acquired from client-side memory 5 and outputs display information for the system screen which is the requested system screen and which has the specified attribute information, memo information having the specified attribute information, and video data, to the display device 1.

By this means, the display device 1 displays the memo information on the system screen associated by the imparting of attribute information. At this time, in display of memo information, objects and characters in memo information can be made to blink based on video data. Further, audio data is output by the audio output device 16.

[3-3] Effects

The above-described third embodiment can exhibit the following effects. That is, upon display of memo information by the display device 1, output video data giving notification of the existence of memo information, and blinking of objects of memo information and of characters in memo information can be performed. Consequently, similarly to the above second embodiment, an operator who has created memo information can clearly be notified of the existence of memo information. Hence overlooking of memo information is reduced, and the usefulness of memo information can be further enhanced. Further, by adding attribute values for video data, video data can be distinguished by the contents of memo information. Specifically, classification by the importance of the memo contents in memo information, classification by the equipment for monitoring associated with the memo information, and similar are possible. This is similar to the effects of the above second embodiment; but in addition to audio data, the operator's attention can be attracted by video data as well, so that the burden of reading memo information one at a time on a screen and ascertaining contents is lightened, and the efficiency of monitoring tasks can be further enhanced.

(4) Fourth Embodiment

[4-1] Configuration

Figure 8:
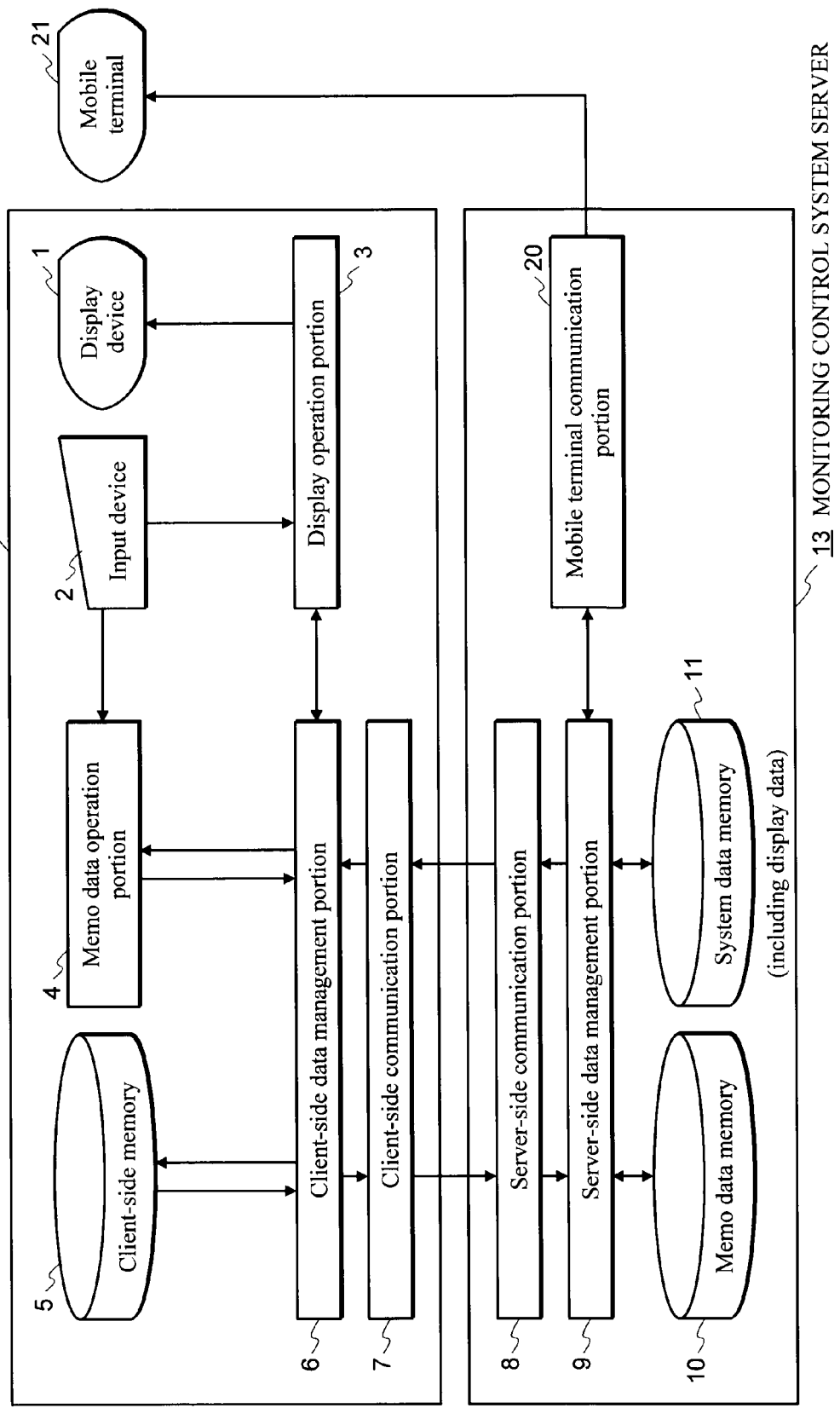
FIG. 8 shows the configuration of a fourth embodiment of the invention.

A fourth embodiment of the invention is explained referring to FIG. 8. FIG. 8 is a configuration diagram of the fourth embodiment. A characteristic of the fourth embodiment is the addition to the above-described first embodiment of a mobile terminal communication portion 20 and a mobile terminal 21.

The mobile terminal communication portion 20 is connected to the server-side data management portion 9 provided in the monitoring control system server 13, and is configured so as to send memo information to the mobile terminal 21 based on attribute information associated at the time of memo information creation. More specifically, when an operator has issued a request to transmit memo information to the mobile terminal 21, the request is received by the server-side data management portion 9, the memo information is acquired from memo data memory 10 according to the request, and the memo information is transmitted to an arbitrary mobile terminal 21.

Upon creation of memo information through operator operation, the input device 2 registers attribute information of the transmission destination mobile terminal in the memo information. Attribute information of a transmission destination mobile terminal is attribute information used to transmit memo information to a desired mobile terminal 21.

[4-2] Action

Action of the fourth embodiment having the above-described configuration is as follows. That is, when an operator uses the input device 2 to create memo information, attribute information for a transmission destination mobile terminal is registered in the memo information. At this time, the persons in charge of equipment monitored by the monitoring control system can be automatically assigned to the transmission destination mobile terminal attribute information, by attribute information imparted to the memo information.

For example, when the data ID of a circuit breaker is used as attribute information imparted to memo information, the mobile terminal 21 of the maintenance person in charge managing the circuit breaker can be assigned to the transmission destination mobile terminal attribute information. Further, as transmission destination mobile terminal attribute information, arbitrary attribute information can be selected and can be assigned with an arbitrary mobile terminal 21 as the destination.

The memo data operation portion 4 sends memo information, with transmission destination mobile terminal attribute information registered by the input device 2, to memo data memory 10 via the client-side communication portion 7, server-side communication portion 8, and server-side data management portion 9, and stores this in memo data memory 10. And, when there is an operator request to send memo information to the mobile terminal 21, the client-side operation terminal 12 sends this request to the mobile terminal communication portion 20 via the client-side communication portion 7, mobile-side communication portion 8, and server-side data management portion 9.

Having received the operator request from the client-side operation terminal 12, the mobile terminal communication portion 20 acquires the memo information from memo data memory 10, and based on the transmission destination mobile terminal attribute information, transmits the memo information to the transmission destination mobile terminal 21 registered in the memo information. In this way, through reception of memo information by the mobile terminal 21, the person in charge having the mobile terminal 21 can be notified of the memo information.

The mobile terminal communication portion 20 may be configured so as to periodically affirm whether transmission destination mobile terminal attribute information exists in memo information acquired from memo data memory 10. In this case, if transmission destination mobile terminal attribute information is included in memo information, the memo information can be automatically transmitted to the transmission destination mobile terminal 21, without waiting for an operator request from the client-side operation terminal 12.

[4-3] Effects

By means of the above fourth embodiment, by utilizing a mobile terminal 21, memo information can promptly be transmitted to a person in charge who is to recognize the memo information. Hence the person in charge can learn of trouble information or other important information relating to the circumstances of system operation without delay, and can contribute to improve system stability.

Moreover, in the fourth embodiment, persons in charge related to attribute information can be automatically assigned to memo information transmission destinations, based on attribute information imparted to memo information. By this means, the occurrence of such problems as transmission omission due to omission of destinations of persons in charge who are to affirm the memo information can be prevented, and contribution to enhanced system reliability is possible.

(5) Fifth Embodiment

[5-1] Configuration

Figure 9:
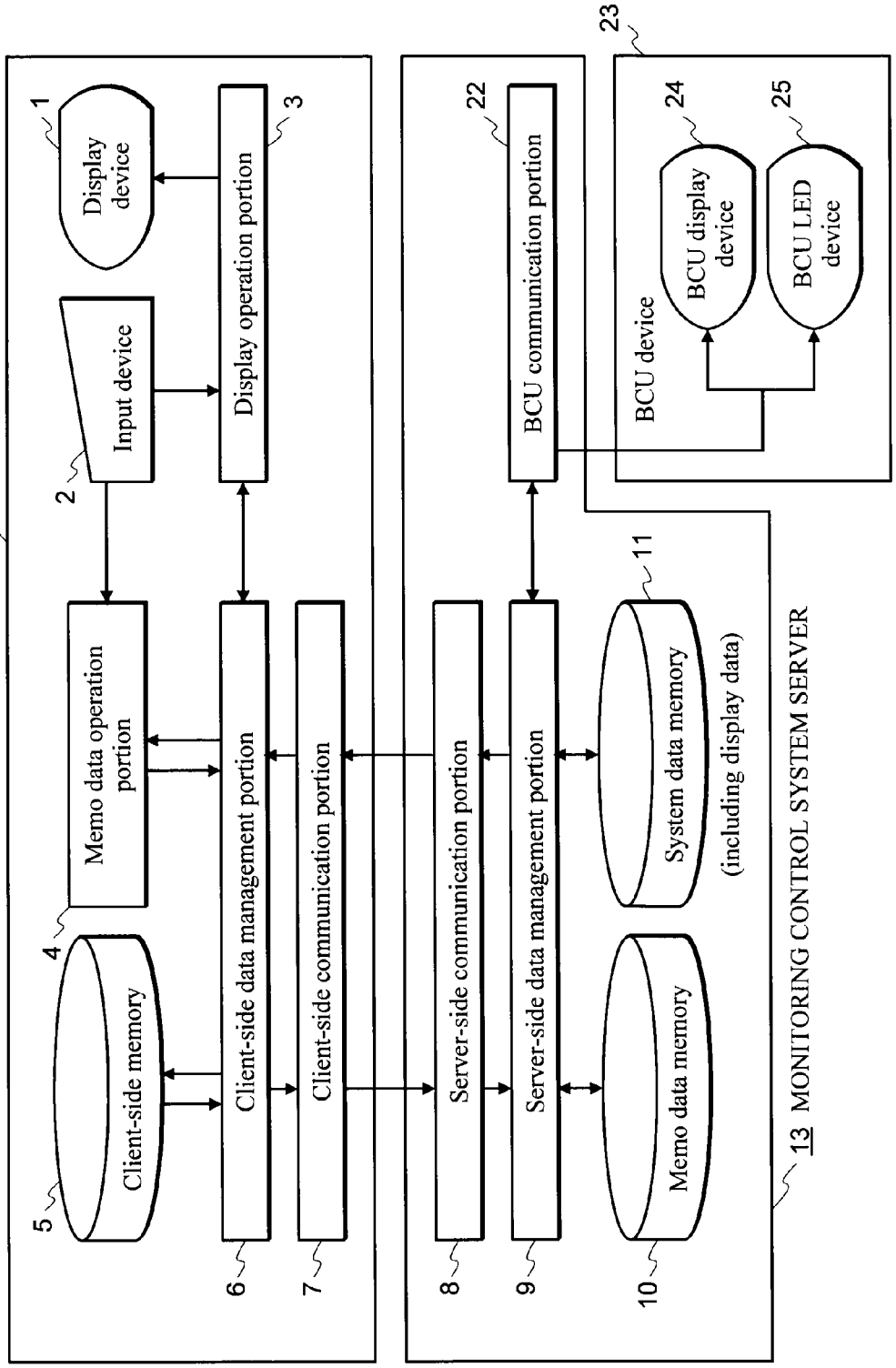
FIG. 9 shows the configuration of a fifth embodiment of the invention.

Next, a fifth embodiment of the invention is explained using FIG. 9. FIG. 9 is a configuration diagram of the fifth embodiment. The fifth embodiment substitutes a BCU communication portion 22 and BCU device 23 for the mobile terminal communication portion 20 and mobile terminal 21 in the above-described fourth embodiment; other portions are the same as in the configuration of the fourth embodiment.

A BCU device 23 is a Bay Control Unit; this device is a portion which performs monitoring, control and measurement of circuit breakers, isolators, and other equipment in a substation, and which exchanges information relating to this monitoring, control and measurement with a substation monitoring control system. The BCU device 23 comprises a BCU display device 24 capable of display of memo information and a BCU LED device 25, to which flashing requests are submitted.

The BCU communication portion 22 is provided in the monitoring control system server 13 and is connected to the server-side data management portion 9, and is configured so as to transmit memo information to the BCU device 23 based on attribute information associated at the time of memo creation. More specifically, when an operator makes a request to the BCU device 23 to transmit memo information, the request is received from the server-side data management portion 9, memo information is acquired from memo data memory 10 according to the request, and the memo information is transmitted to the BCU display device 24 and BCU LED device 25 of an arbitrary BCU device 23.

Upon memo creation by operator operation, the input device 2 registers attribute information of the transmission destination BCU device in the memo information. Attribute information of a transmission destination BCU device is attribute information used to transmit memo information to the BCU display device 24 and BCU LED device 25 of an arbitrary BCU device 23.

[5-2] Action

Action of the above-described fifth embodiment is as follows. That is, when an operator uses the input device 2 to create memo information, attribute information for a transmission destination BCU device is registered in the memo information. At this time, BCU devices 23 which have authority for the attribute information can be assigned automatically, for each attribute information item imparted to memo information, as attribute information of transmission destination BCU devices.

For example, when the data ID of a circuit breaker is used as attribute information imparted to memo information, the BCU device 23 which has authority for this circuit breaker can be assigned as attribute information for the transmission destination BCU device. Further, arbitrary attribute information can be selected as the transmission destination BCU device attribute information, and an arbitrary BCU device 23 can be assigned as the destination.

The memo data operation portion 4 sends memo information, with transmission destination BCU device attribute information registered by the input device 2, to memo data memory 10 via the client-side communication portion 7, server-side communication portion 8, and server-side data management portion 9, and the memo data memory 10 stores the memo information. And, when there is an operator request to send memo information to the BCU device 23, the client-side operation terminal 12 sends this request to the BCU communication portion 22 via the client-side communication portion 7, mobile-side communication portion 8, and server-side data management portion 9.

Having received the operator request from the client-side operation terminal 12, the BCU communication portion 22 acquires the memo information from memo data memory 10, and based on the transmission destination mobile terminal attribute information, transmits the memo information to the transmission destination BCU device 23 registered in the memo information. The BCU device 23, having received the memo information, displays the memo information on the BCU display device 24, and together with this issues a flashing request to the BCU LED device 25.

Further, the BCU communication portion 22 may be configured so as to periodically affirm whether transmission destination attribute information exists in memo information acquired from memo data memory 10. If transmission destination BCU device attribute information is included in memo information, the memo information can be automatically sent to the transmission destination BCU device 23, and the memo information displayed by the BCU display device 24, and together with this a flashing request can be issued to the BCU LED device 25.

[5-3] Effects

Normally, equipment which is an object for monitoring of a BCU device 23 is at a site distant from the monitoring control device on which event screens and trend screens of the substation monitoring control system are displayed. For this reason, in the prior art it has been difficult to affirm memo information in a BCU device 23; but by applying the above-described fifth embodiment, personnel can affirm memo information even from monitoring equipment installed at a location distant from the monitoring control system. By this means, trouble information and other circumstances of system operation can be ascertained by the person in charge without delay.

And, based on attribute information imparted to memo information, relating to a transmission destination BCU device 23, a BCU device related to the attribute information can automatically be assigned. Hence a person in charge of the BCU device 23 which is to recognize the memo information can reliably be notified of the memo information, and the monitoring system can be enhanced.

(6) Sixth Embodiment

[6-1] Configuration

Figure 10:
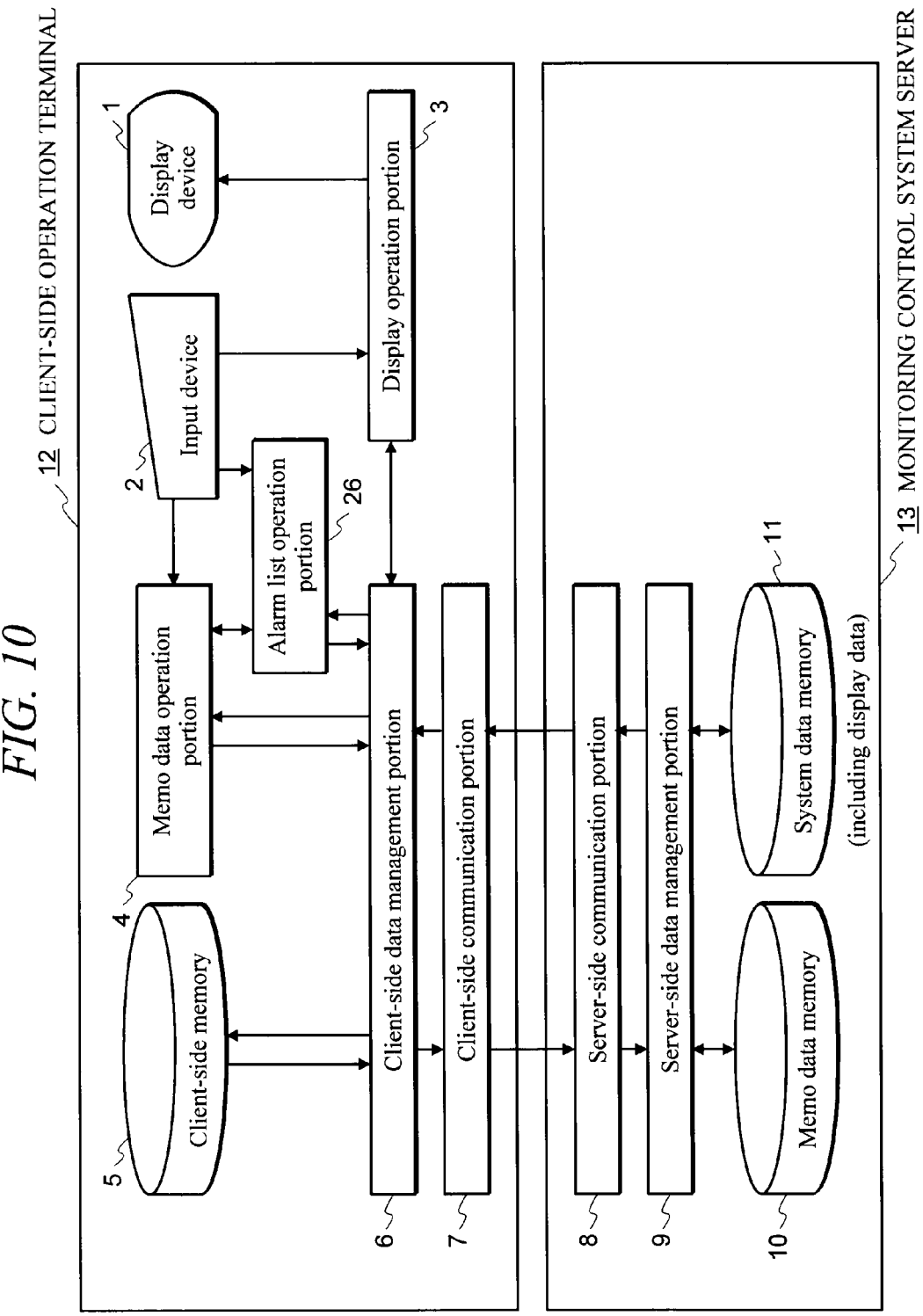
FIG. 10 shows the configuration of a sixth embodiment of the invention.
Figure 11:
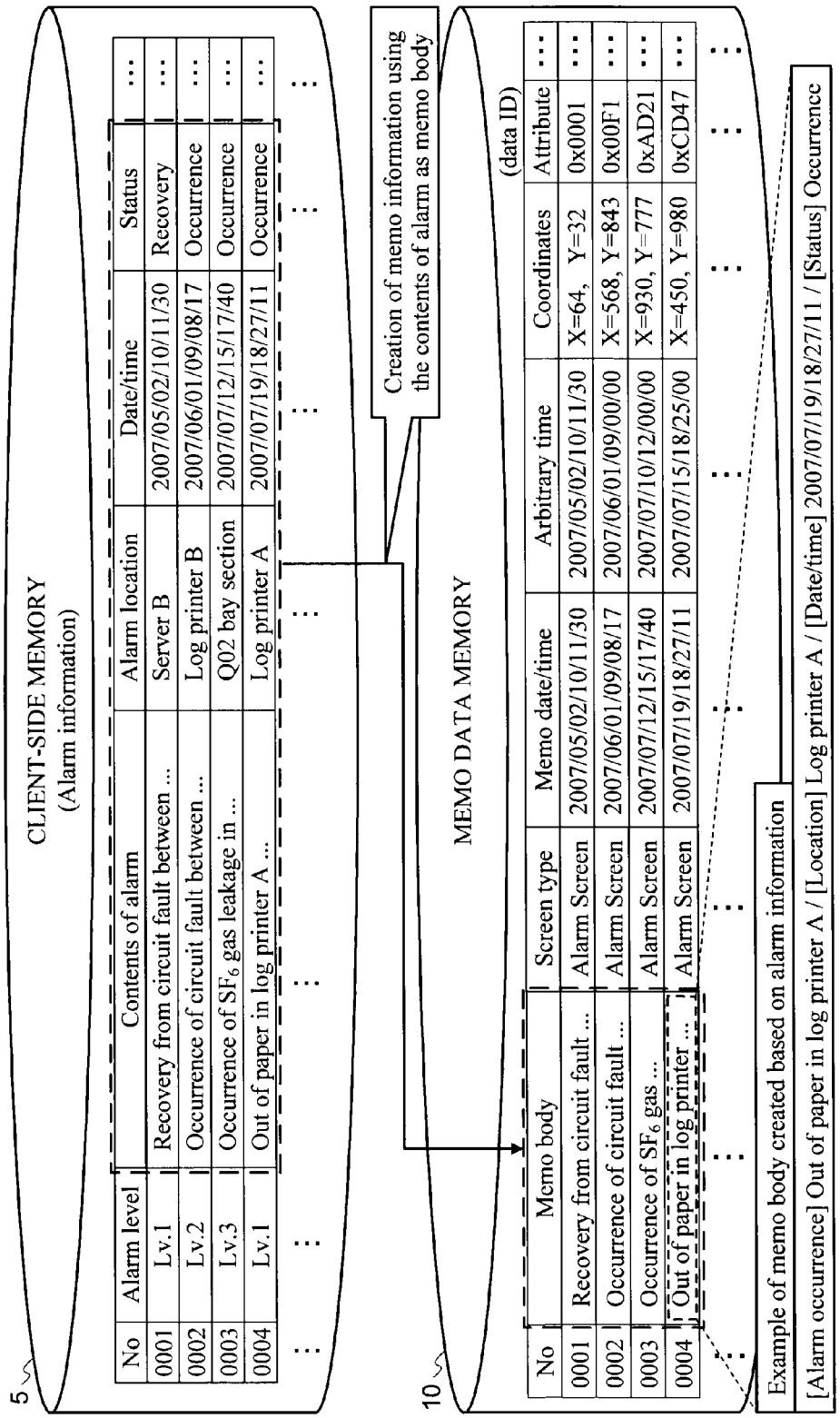
FIG. 11 is an explanatory diagram showing the specific contents of data stored in a storage device in the sixth embodiment.

A sixth embodiment of the invention is explained referring to FIG. 10 and FIG. 11. FIG. 10 is a configuration diagram of the sixth embodiment, and FIG. 11 is an explanatory diagram showing specific contents of data stored in a storage device.

A characteristic of the sixth embodiment is the addition to the configuration of the above-described first embodiment of an alarm list operation portion 26 in the client-side operation terminal 12. Various alarm information is stored in client-side memory 5. Alarm information is information to provide a warning when a system anomaly has occurred. In the sixth embodiment, alarm information is stored in client-side memory 5.

The alarm list operation portion 26 is configured so as to acquire the alarm information from client-side memory 5 based on a request from an operator using the input device 2 and output the alarm information to the memo data operation portion 4. Further, the memo data operation portion 4 creates data indicating the memo contents based on the input alarm information, and adds this to memo information. FIG. 11 shows an example of a memo body in memo information created based on alarm information.

Further, the alarm list operation portion 26 can create memo information from alarm information without operation by an operator. For example, if the presence or absence of a newly occurring alarm is periodically affirmed, when new alarm information occurs, memo information can be created from the alarm information without waiting for an operator request.

[6-2] Action

Action of the sixth embodiment having the above-described configuration is as follows. That is, an operator uses the input device 2 to issue to the alarm list operation portion 26 a request to create, as memo information, arbitrary alarm information displayed on an alarm list screen. The alarm list operation portion 26 acquires the alarm information requested by the operator from client-side memory 5, and passes the alarm information to the memo data operation portion 4.

The memo data operation portion 4 creates data indicating the memo body in memo information based on the alarm information received from the alarm list operation portion 26. The memo data operation portion 4 outputs the data of the created memo body to the client-side data management portion 6. Here, by occasionally checking alarm information added to the alarm list screen, when new alarm information has been added to the alarm list screen, the alarm list operation portion 26 can automatically create memo information from the alarm information, omitting the operator request in the above-described procedure.

[6-3] Effects

By means of the above sixth embodiment, alarm information on an alarm list screen can be displayed, without change, as memo information on an arbitrary system screen. Hence when affirming various system screens (trend graph screens, event list screens, gas compartment screens, and similar), alarm information displayed as memo information and a system screen can be referenced together, and factors causing event information can be quickly ascertained. And, memo information can be automatically created from alarm information conveyed at the time of system anomaly, without tasks being performed by the operator himself. Hence the burden of tasks imposed on the operator can be further alleviated, and task efficiency is greatly improved.

(7) Seventh Embodiment

[7-1] Configuration

Figure 12:
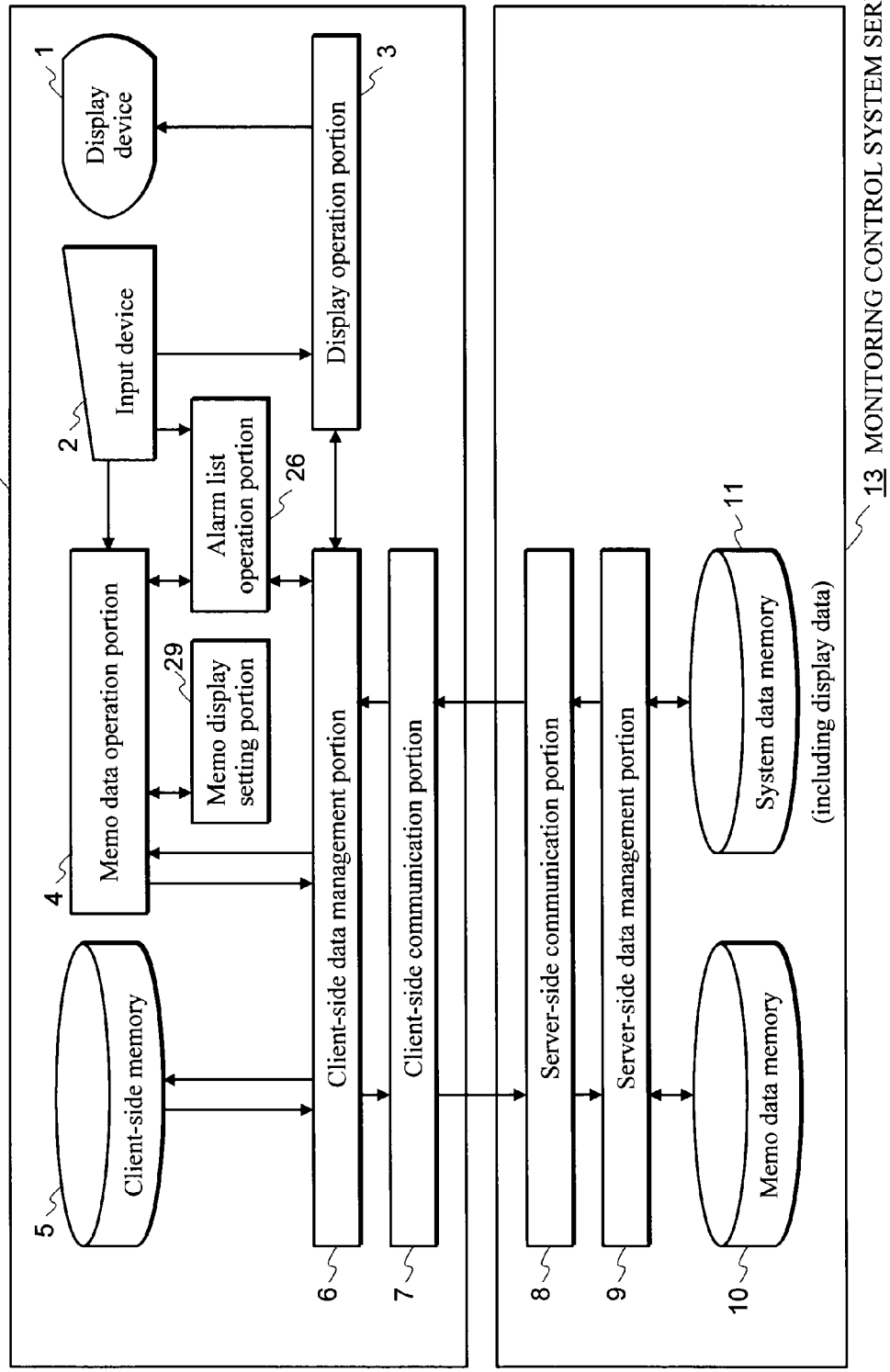
FIG. 12 shows the configuration of a seventh embodiment of the invention.
Figure 13:
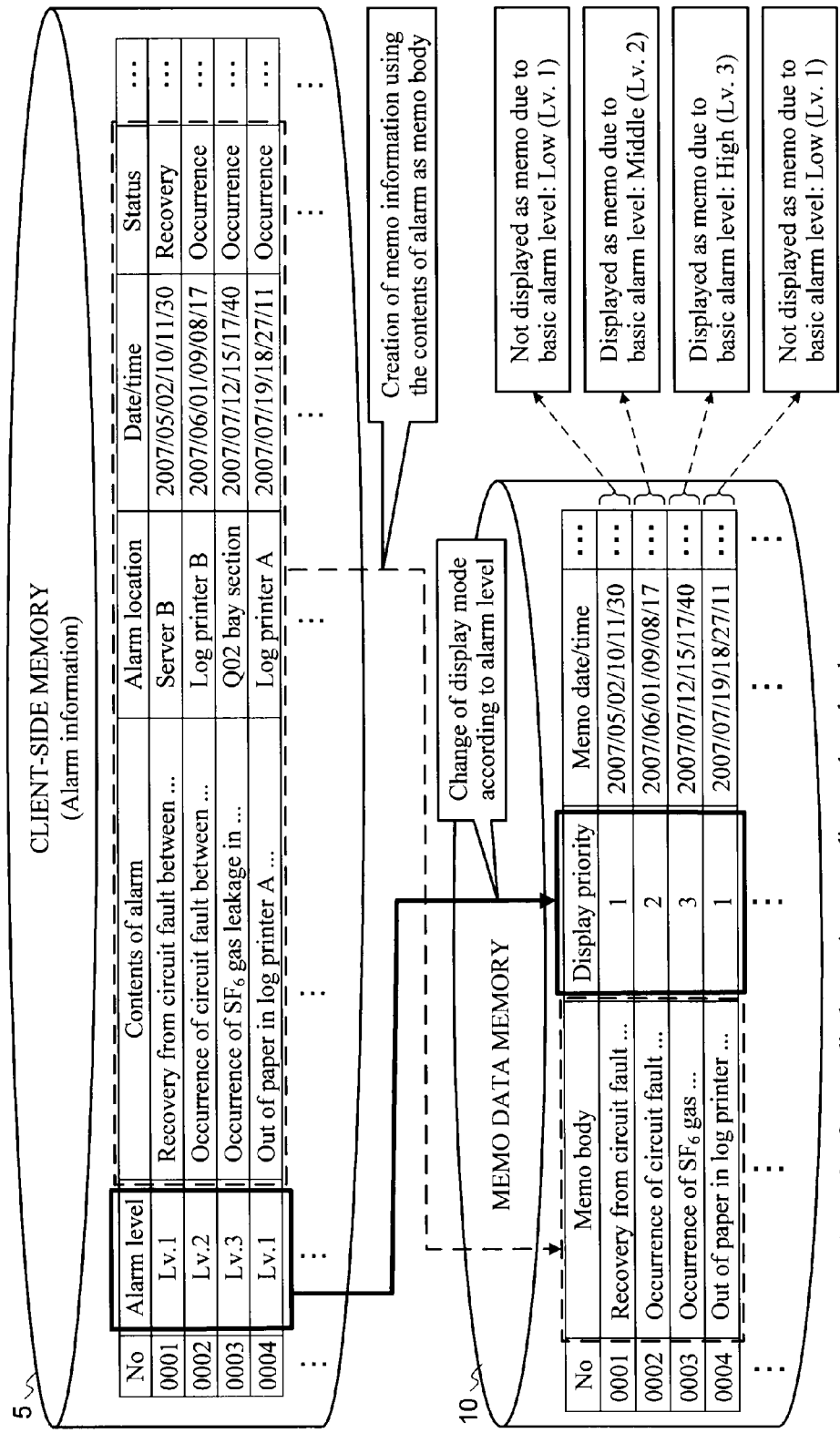
FIG. 13 is an explanatory diagram showing the specific contents of data stored in a storage device in the seventh embodiment.

A seventh embodiment of the invention is explained referring to FIG. 12 and FIG. 13. FIG. 12 is a configuration diagram of the seventh embodiment, and FIG. 13 is an explanatory diagram showing specific contents of data stored in a storage device.

A characteristic of the seventh embodiment is the addition to the configuration of the above-described sixth embodiment of a memo display setting portion 29 in the client-side operation terminal 12. The memo display setting portion 29 is configured so as to add, to memo information, display setting attribute values to set whether memo information is to be displayed, whether there is blinking in memo information, and the display color, according to the importance of the alarm information, that is, the alarm level.

[7-2] Action

In the seventh embodiment having the above-described configuration, the memo data operation portion 4 creates the data of a memo body indicating the contents of memo information based on alarm information received by the alarm list operation portion 26 (processing indicated by the dashed-line arrows of FIG. 13).

At this time, the memo display setting portion 29 adds display setting attribute values to the memo information according to the alarm level, which is the importance of the alarm information. In the processing indicated by the solid-line arrow of FIG. 13, an example is shown in which a setting is performed indicating whether the data of the memo body in the memo information is or is not output to the display screen based on the alarm level in the alarm information, which here is a level indicating the degree of urgency of the alarm information.

In this way, by means of the memo display setting portion 29, memo information to which has been imparted display setting attribute values according to the importance of the alarm information is stored in memo data memory 10 of the monitoring control system server 13 via the memo data operation portion 4. This memo information is displayed on a display screen of the display device 1 according to the settings of the above-described display setting attribute values (in the example of FIG. 13, the setting of whether or not to display the memo).

Further, in FIG. 13 the display settings by the memo display setting portion 29 set whether to display a memo according to the alarm level; but other configurations are possible, and for example settings to modify the display color of memo information according to the alarm level (more specifically, settings to use a conspicuous color when the alarm level is high, and an inconspicuous color when the alarm level is low), or settings to cause a memo with a high alarm level to blink and be more conspicuous, are also possible.

[7-3] Effects

By means of the above-described seventh embodiment, settings for whether a memo is displayed by the memo display setting portion 29, the display color, and whether blinking is used can be modified according to the importance of the memo contents, so that important memo information can be clearly presented to the operator. As a result, memo information is not overlooked by the operator. And, by making settings to determine whether a memo is displayed, the number of memo information items for display on a screen can be limited appropriately, so that problems of display data being buried in memo information on a screen and being difficult to view can be avoided.

(8) Other Embodiments

Figure 14:
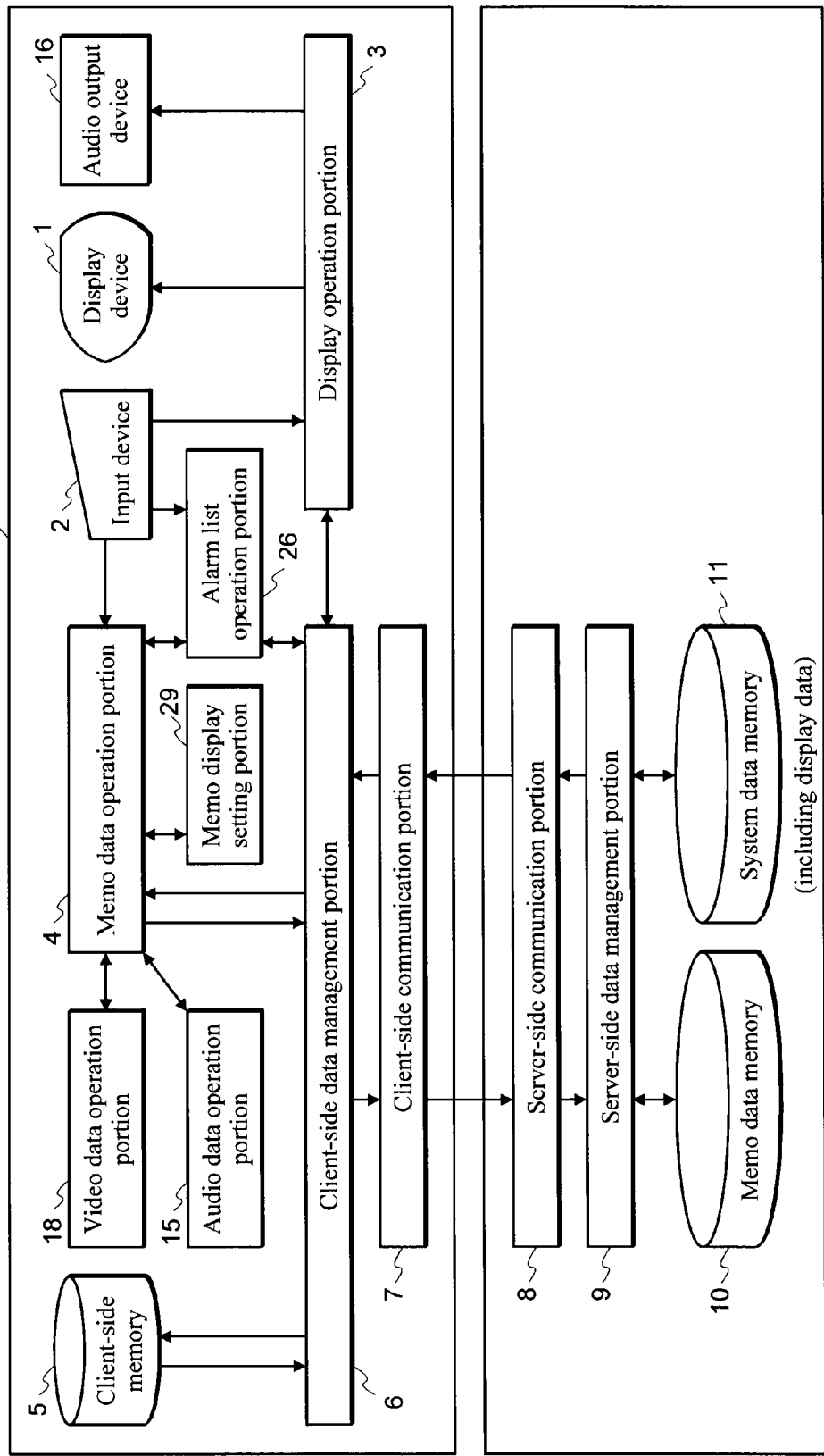
FIG. 14 shows the configuration of another embodiment of the invention.
Figure 15:
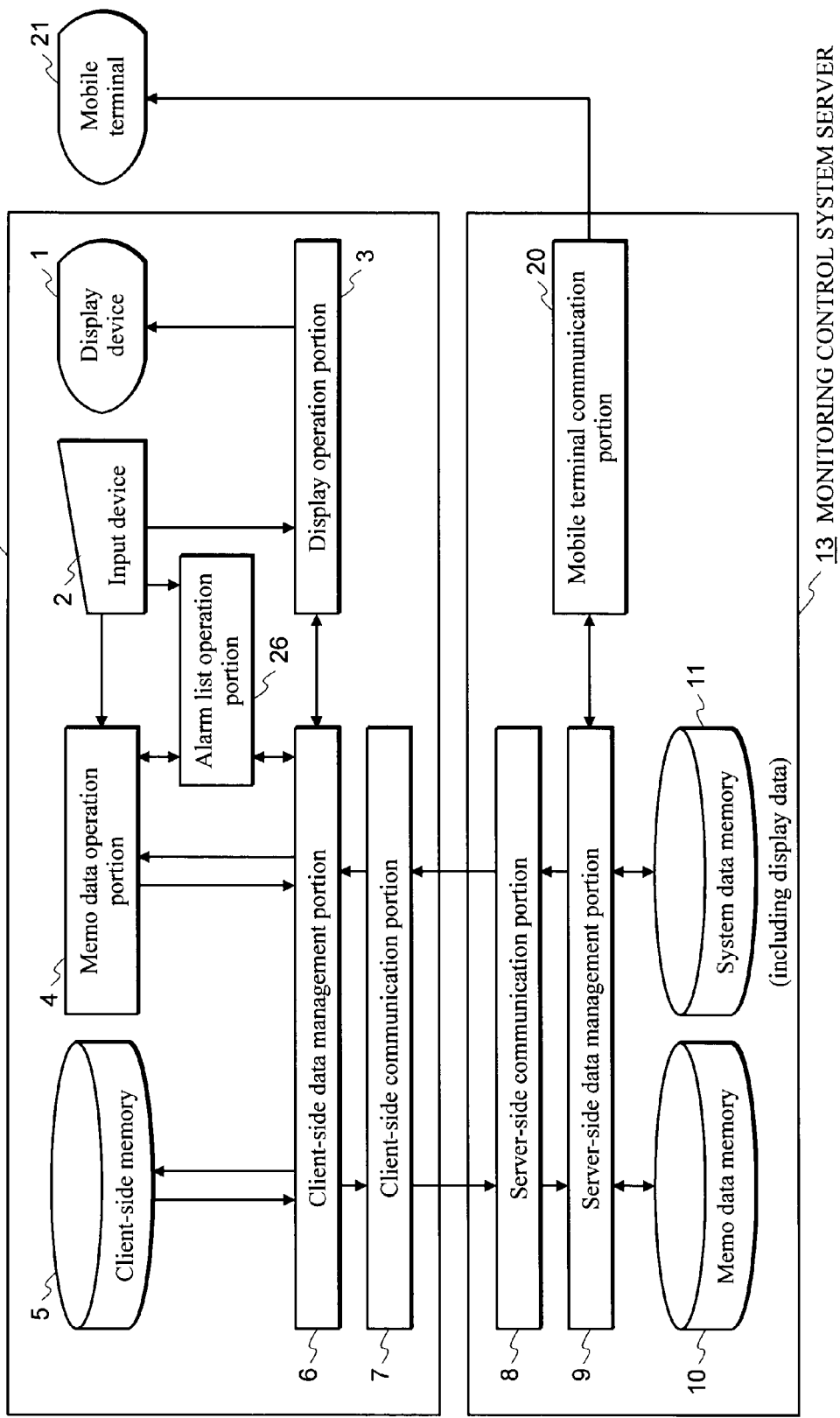
FIG. 15 shows the configuration of another embodiment of the invention.

This invention is not limited to the above embodiments, and the embodiments can also be combined appropriately. For example, FIG. 14 is an example which combines the third embodiment (see FIG. 6) and the seventh embodiment (see FIG. 12), and FIG. 15 is an example which combines the fourth embodiment (see FIG. 8) and the sixth embodiment (see FIG. 10). By means of these embodiments, the effects of action of the embodiments can be obtained together.

Further, in the above-described sixth embodiment the memo body of the memo information is created using alarm information; but information which can be used when creating memo information is not limited to alarm information, and similar effects are obtained from using event list information and various measurement information. And, in all of the above embodiments, a client-server model is used; but embodiments are not necessarily limited to this model, and similar effects of action can for example be exhibited in a system in which client functions and server functions are integrated.

A computer which realizes this invention reads a program recorded on a recording medium, and operation thereof is controlled by this program to perform the above-described processing. A program which can be executed by the computer can for example be written onto a magnetic disk, optical disc, semiconductor memory, or other recording medium and applied to various devices, and can also be transmitted by a communication medium and applied to various devices.

The invention claimed is:

1. A monitoring and control system, comprising:
a display unit selectively switching a plurality of system screens and displaying event information showing a change in a state of an object to be monitored and memo information created by an operator on a selected system screen;
an input unit for receiving an input of arbitrary data including the memo information and an input instruction for switching the system screens from the operator; and
a memo data operation portion which, when the memo information regarding the system screen displayed by the display unit is input by the input unit, imparts a plurality of attribute values including time information of data displayed in the system screen and data ID information specifying the data displayed in the system screen, as attribute information relating to the system screen to the memo information, wherein:
when a request of displaying an arbitrary system screen is input and any one of the attribute values is designated by the input unit, the display unit displays the requested system screen and displays the memo information having the designated attribute value on the system screen.

2. The monitoring and control system according to claim 1, further comprises:
a display operation portion which is connected to the display unit and input unit; and
a storage unit which is connected to the display operation portion and stores at least display information for displaying the system screen, wherein:
the display operation portion is adopted to receive the memo information from the memo data operation portion, acquire display information of the system screen having the attribute information from the storage unit, and output the memo information and display information to the display unit.

3. The monitoring and control system according to claim 1, wherein:
the system is composed of a client-side operation terminal and monitoring control system server which are connected by a data communication system, the input unit and the display unit are provided to the client-side operation terminal, and the client-side operation terminal has a second storage unit which stores the memo information, the display information of the system screen, and the event information.

4. The monitoring and control system according to claim 1, wherein:
the memo data operation portion is adopted to impart to the memo information, attribute information relating to the memo information itself, and
the attribute information relating to the memo information includes at least any one of a type of system screen when an operator created the memo, the time of creating the memo, the coordinates of the memo on a screen, a data ID set in advance.

5. The monitoring and control system according to claim 1, further comprises:
an audio data operation portion which imparts an audio data to the memo information; and
an audio output unit which outputs the audio data.

6. The monitoring and control system according to claim 5, wherein:
the audio data operation portion is adopted to be capable of arbitrarily setting in the audio data, a type and loudness of audio.

7. The monitoring and control system according to claim 1, further comprises:
a video data operation portion which imparts a video data to the memo information, wherein:
the display unit is adopted to display the memo information to which the video data is imparted.

8. The monitoring and control system according to claim 1, wherein:
a mobile terminal is connected via a communication portion, and
the communication portion is adopted to transmit the memo information to the mobile terminal based on the attribute information that was associated with the memo information when creating the memo.

9. The monitoring and control system according to claim 1, wherein:
a BCU device is connected via a communication portion, and
the communication portion is adopted to transmit the memo information to the BCU device based on the attribute information that was associated with the memo information when creating the memo.

10. The monitoring and control system according to claim 1, further comprises:
an alarm information storage unit which stores alarm information that is informed when a system fault occurs; and
an alarm list operation portion which acquires the alarm information from the alarm information storage, and outputs the alarm information to the memo data operation portion, wherein:
the memo data operation portion is adopted to create a data showing contents of a memo based on the alarm information, and add the created data to the memo information.

11. The monitoring and control system according to claim 10, further comprises:
a memo display setting portion which performs setting of whether the memo information is displayed, setting of whether a blinking is used, and setting of display color in accordance with the importance of the alarm information or a request from an operator.

12. The monitoring and control system according to claim 1, wherein:
the display unit is adopted to display as the system screen, at least any one of a trend graph screen, an event list screen, and a gas section screen.

* * * * *